United States Patent
Arai et al.

(10) Patent No.: US 12,422,694 B2
(45) Date of Patent: Sep. 23, 2025

(54) OPTICAL UNIT WITH SHAKE CORRECTION FUNCTION

(71) Applicant: NIDEC INSTRUMENTS CORPORATION, Nagano (JP)

(72) Inventors: Tsutomu Arai, Nagano (JP); Takeshi Sue, Nagano (JP); Shinji Minamisawa, Nagano (JP)

(73) Assignee: NIDEC INSTRUMENTS CORPORATION, Nagano (JP)

( * ) Notice: Subject to any disclaimer, the term of this patent is extended or adjusted under 35 U.S.C. 154(b) by 352 days.

(21) Appl. No.: 18/322,568

(22) Filed: May 23, 2023

(65) Prior Publication Data
US 2023/0384612 A1    Nov. 30, 2023

(30) Foreign Application Priority Data
May 27, 2022   (JP) .................... 2022-086607

(51) Int. Cl.
G02B 27/64    (2006.01)
H04N 23/68    (2023.01)

(52) U.S. Cl.
CPC ......... *G02B 27/646* (2013.01); *H04N 23/687* (2023.01); *G03B 2205/0007* (2013.01)

(58) Field of Classification Search
CPC .. G02B 27/646; H04N 23/685; H04N 23/687; G03B 2205/0007; G03B 2205/0015
See application file for complete search history.

(56) References Cited

U.S. PATENT DOCUMENTS

| | | | |
|---|---|---|---|
| 11,493,779 B2 | 11/2022 | Minamisawa | |
| 11,947,253 B2* | 4/2024 | Minamisawa | G03B 30/00 |
| 2011/0262121 A1* | 10/2011 | Yanagisawa | G02B 27/646 |
| | | | 396/55 |
| 2016/0170227 A1* | 6/2016 | Minamisawa | H04N 23/57 |
| | | | 359/557 |
| 2020/0033626 A1* | 1/2020 | Wu | G02B 7/023 |
| 2020/0174273 A1* | 6/2020 | Minamisawa | G03B 5/02 |

FOREIGN PATENT DOCUMENTS

JP     2020160370    10/2020

* cited by examiner

*Primary Examiner* — Christopher E Mahoney
(74) *Attorney, Agent, or Firm* — JCIPRNET

(57) ABSTRACT

In an optical unit with a shake correction function, a cylindrical holder having an inner peripheral side on which a camera module is fixed is composed of metal. In the optical unit with a shake correction function, a case-side protrusion projecting toward the inner peripheral side of a cylindrical case surrounding the outer peripheral surface of the holder is formed on the inner peripheral side of the case. When a movable body moves relative to a fixed body while the optical axis of a camera module tilts the most, portions of the holder farther inside in the optical axis direction than edges formed on the outer peripheral surface of the holder before the edges come into contact with the inner peripheral surface of the case.

5 Claims, 8 Drawing Sheets

OPTICAL UNIT WITH SHAKE CORRECTION FUNCTION

CROSS REFERENCE TO RELATED APPLICATION

The present invention claims priority under 35 U.S.C. § 119 to Japanese Application No. 2022-086607 filed May 27, 2022, the entire content of which is incorporated herein by reference.

BACKGROUND

Field of the Invention

At least an embodiment of the present invention relates to an optical unit with a shake correction function to be mounted in a mobile device or the like.

Description of the Related Documents

Optical units with a shake correction function mounted in a mobile device or the like have been known (see Patent Application Laid-Open No. JP2020-160370, for example). The optical unit with a shake correction function described in JP2020-160370 has a movable body having an optical module, a gimbal frame that holds the movable body in a rotatable manner, and a fixed body that holds the gimbal frame in a rotatable manner. The movable body includes a holder frame that holds the optical module. The fixed body includes a frame that surrounds the outer peripheral surface of the movable body. The holder frame and the case are formed of a resin material.

The optical unit with a shake correction function described in JP2020-160370 includes a drive mechanism for shake correction that oscillates the movable body relative to the fixed body. The drive mechanism for shake correction includes a drive magnet fixed to the holder frame and a drive coil fixed to the case. The holder frame is formed with a magnet placement recess in which the drive magnet is placed. Since the holder frame is composed of resin, a plate-like yoke member is disposed in the magnet placement recess.

In the optical unit with a shake correction function described in JP2020-160370, the holder frame is formed of a resin material. Therefore, in this optical unit with a shake correction function, the thickness of the holder frame in the radial direction of the optical module needs to be increased to ensure the strength of the holder frame. However, if the thickness of the holder frame in the radial direction of the optical module is increased, the holder frame becomes larger in the radial direction of the optical module, and this results in a larger optical unit with a shake correction function in the radial direction of the optical module.

Accordingly, at least an embodiment of the present invention provides an optical unit with a shake correction function that includes a holder having an inner peripheral side on which a camera module is fixed, the optical unit with a shake correction function allowing holder to have a small dimension in the radial direction of the camera module while maintaining the strength of the holder.

SUMMARY

Provided is an optical unit with a shake correction function according to at least an embodiment of the present invention, including a movable body comprising a camera module; an intermediate member that holds the movable body in a rotatable manner; a fixed body that holds the intermediate member in a rotatable manner; and a drive mechanism to rotate the movable body relative to the fixed body in such a manner that an optical axis of the camera module tilts in a selected direction, wherein, the movable body comprises a cylindrical metal holder having an inner peripheral side on which the camera module is fixed, the movable body being rotatable relative to the intermediate member with a first intersecting direction being an axial direction of rotation, the first intersecting direction intersecting the optical axis of the camera module, the intermediate member comprises a plate spring and is rotatable relative to the fixed body with a second intersecting direction being an axial direction of rotation, the second intersecting direction intersecting the first intersecting direction and the optical axis of the camera module, the fixed body comprising a cylindrical resin case surrounding an outer peripheral surface of the holder, and a metal rotation regulating member being fixed to the case and being in contact with the holder to regulate a range of rotation of the movable body relative to the fixed body, and when a direction of the optical axis of the camera module is an optical axis direction, and a direction orthogonal to the optical axis of the camera module positioned at a predetermined reference position is a first direction, the outer peripheral surface of the holder has an edge comprising an end portion of an end surface in the optical axis direction of a metal part comprising at least a portion of the outer peripheral surface of the holder, an inner peripheral side of the case has a case-side protrusion projecting toward the inner peripheral side of the case, and when the movable body moves in the first direction relative to the fixed body while the optical axis of the camera module has a maximum tilt, a portion of the metal part disposed farther inward than the edge in the optical axis direction comes into contact with the case-side protrusion before the edge comes into contact with an inner peripheral surface of the case, or a holder-side protrusion projecting toward an outer peripheral side of the holder is formed or fixed on the outer peripheral side of the holder, and when the movable body moves in the first direction relative to the fixed body while the optical axis of the camera module has the maximum tilt, the holder-side protrusion comes into contact with the inner peripheral surface of the case before the edge comes into contact with the inner peripheral surface of the case.

In an optical unit with a shake correction function according to at least an embodiment of the present invention, a cylindrical holder having an inner peripheral side on which a camera module is fixed is composed of metal. Therefore, in at least an embodiment of the present invention, the thickness of the holder in the radial direction of the camera module can be reduced while the strength of the holder is maintained. Therefore, in at least an embodiment of the present invention, the holder can be made smaller in the radial direction of the camera module while the strength of the holder is maintained. In at least an embodiment of the present invention, the holder is composed of metal and an edge, which constitutes an end portion of an end surface in the optical axis direction of the metal part that constitutes at least a portion of the outer peripheral surface of the holder, is formed on the outer peripheral surface of the holder. Therefore, for example, if the optical unit with a shake correction function is subjected to shock such as a drop and the edge of the outer peripheral surface of the holder collides with the inner peripheral surface of a resin case, there is a risk of the resin case being scraped off and dust being generated.

However, in at least an embodiment of the present invention, an inner peripheral side of the case has a case-side protrusion projecting toward the inner peripheral side of the case, and when the movable body moves in the first direction relative to the fixed body while the optical axis of the camera module has a maximum tilt, a portion of the metal part disposed farther inward than the edge of the outer peripheral surface of the holder in the optical axis direction comes into contact with the case-side protrusion before the edge of the outer peripheral surface of the holder comes into contact with an inner peripheral surface of the case, or a holder-side protrusion projecting toward an outer peripheral side of the holder is formed or fixed on the outer peripheral side of the holder, and when the movable body moves in the first direction relative to the fixed body while the optical axis of the camera module has the maximum tilt, the holder-side protrusion comes into contact with the inner peripheral surface of the case before the edge of the outer peripheral surface of the holder comes into contact with the inner peripheral surface of the case.

Therefore, in at least an embodiment of the present invention, even if the holder moves excessively in the first direction due to a drop or other impact on the optical unit with a shake correction function, it is possible to prevent the edge of the outer peripheral surface of the holder from colliding with the inner peripheral surface of the resin case. Therefore, in at least an embodiment of the present invention, even if the optical unit with a shake correction function is subjected to impact, it is possible to prevent the resin case from being scraped and dust from being generated. In at least an embodiment of the present invention, the range of rotation of the movable body relative to the fixed body is regulated by the rotation regulating member fixed to the case and in contact with the holder. Since the rotation regulating member is composed of metal, dust can be prevented even if the holder and the rotation regulating member come into contact.

In at least an embodiment of the present invention, the optical unit with a shake correction function, for example, includes a spherical body serving as a fulcrum of rotation of the movable body relative to the intermediate member, wherein, the holder comprises a cylindrical module fixing member having an inner peripheral side on which the camera module is fixed, and a sphere fixing member to which the spherical body is fixed, the sphere fixing member being fixed to an outer peripheral surface of the module fixing member, and the sphere fixing member comprises the metal part.

In at least an embodiment of the present invention, a case-side protrusion is formed on the inner peripheral side of the case. With such a configuration, the case-side protrusion is formed on the resin case, which makes it easier to form the case-side protrusion compared to the case where a holder-side protrusion is formed or fixed on a metal holder.

In at least an embodiment of the present invention, when the optical axis direction is a reference optical axis direction while the camera module is positioned at the reference position, a center of the case-side protrusion in the reference optical axis direction is positioned at a same position in the reference optical axis as a fulcrum of the rotation of the intermediate member relative to the fixed body. This configuration makes it possible to prevent the edge of the outer peripheral surface of the holder from coming into contact with the inner peripheral surface of the case when the movable body moves in the first direction relative to the fixed body while the optical axis of the camera module tilts the most, even if the protrusion of the case-side protrusion is reduced. Therefore, it is possible to reduce the size of the case in the radial direction of the camera module while preventing the edges of the outer peripheral surface of the holder from coming into contact with the inner peripheral surface of the case when the movable body moves in the first direction relative to the fixed body while the optical axis of the camera module tilts the most.

In at least an embodiment of the present invention, for example, when the optical axis direction is a reference optical axis direction while the camera module is positioned at the reference position, the case-side protrusion comprises a first tilting portion, a second tilting portion, and a connecting portion, the first tilting portion having a first tilting surface tilting farther to an outer peripheral side of the case at one side in the reference optical axis direction, the second tilting portion having a second tilting surface tilting farther to the outer peripheral side of the case at another side in the reference optical axis direction, the connecting portion having a connecting surface connecting the first tilting surface and the second tilting surface and being disposed parallel to the reference optical axis direction. In such a case, since the case-side protrusion can be formed over a relatively wide area in the reference optical axis direction, the strength of the case can be increased.

As described above, at least an embodiment of the present invention makes it possible to, in an optical unit with a shake correction function and including a holder having an inner peripheral side on which a camera module is fixed, downsize the holder in the radial direction of the camera module, while securing the strength of the holder.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which.

(A) and (B) of FIG. 7 are schematic diagrams for describing the relationship between the holder and the case when the optical unit with a shake correction function illustrated in FIG. 1 is subjected to shock such as a drop.

DETAILED DESCRIPTION

Figure 1:
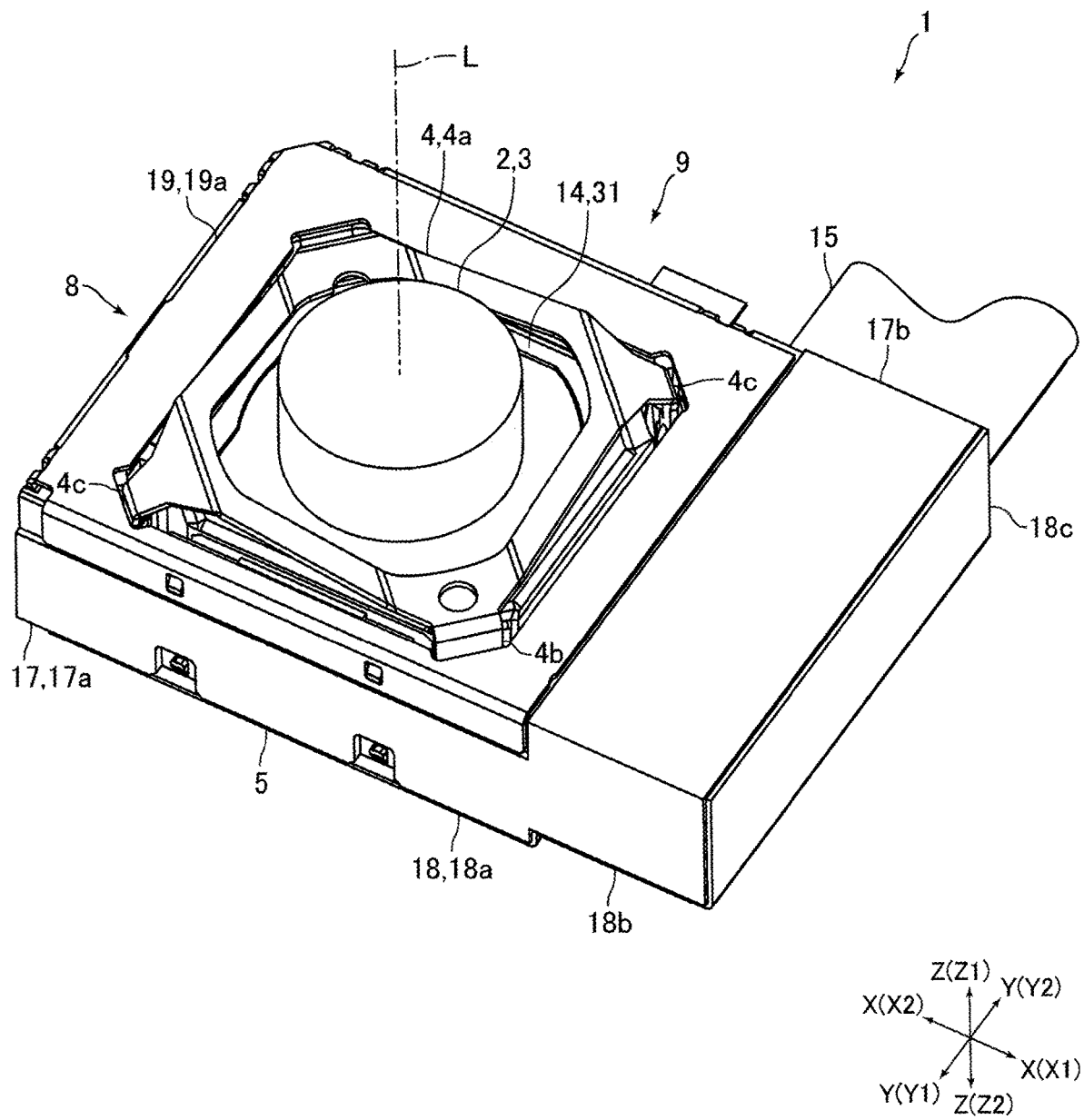
FIG. 1 is a perspective view of an optical unit with a shake correction function according to at least an embodiment of the present invention.
Figure 2:
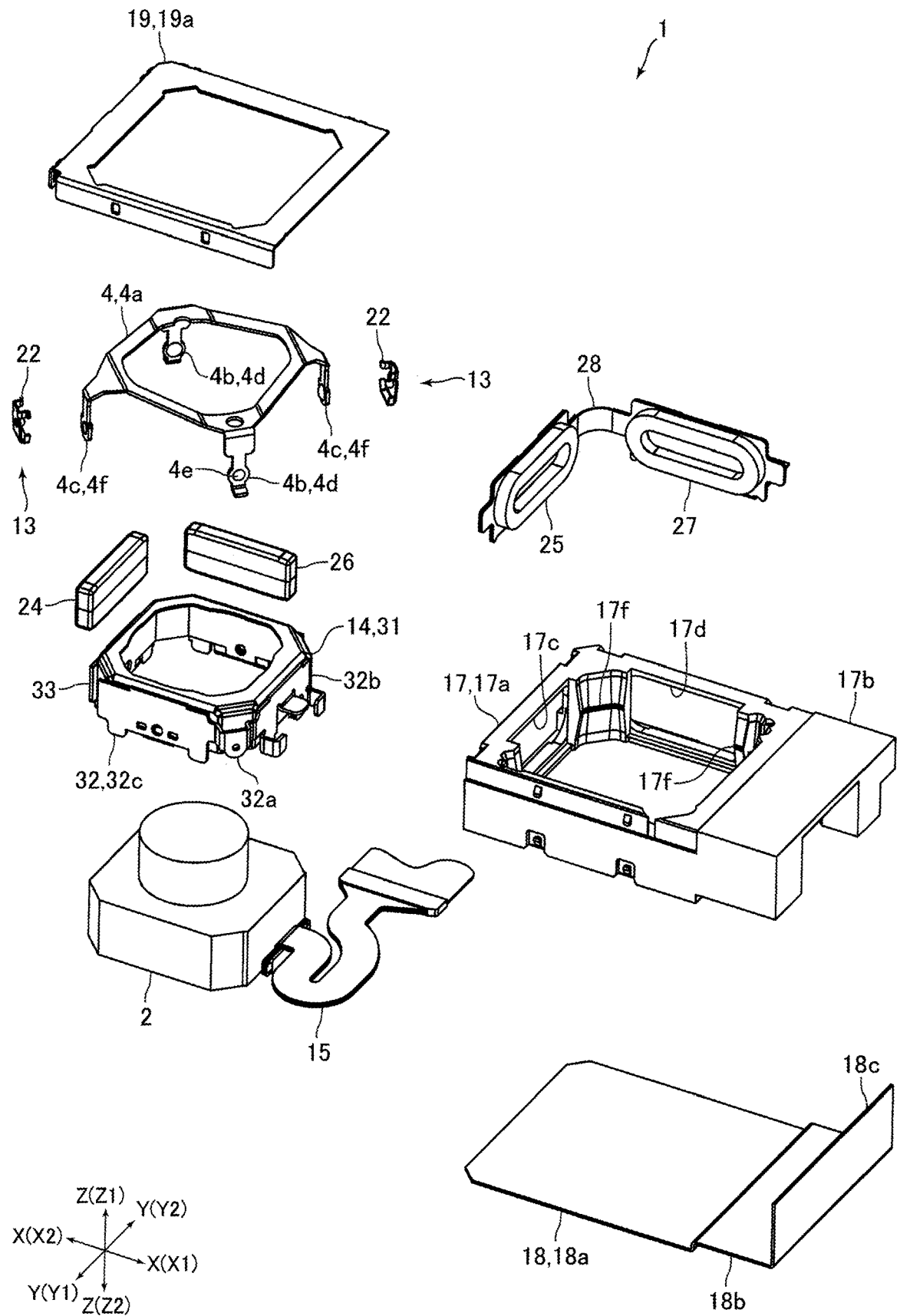
FIG. 2 is an exploded perspective view of the optical unit with a shake correction function illustrated in FIG. 1.
Figure 3:
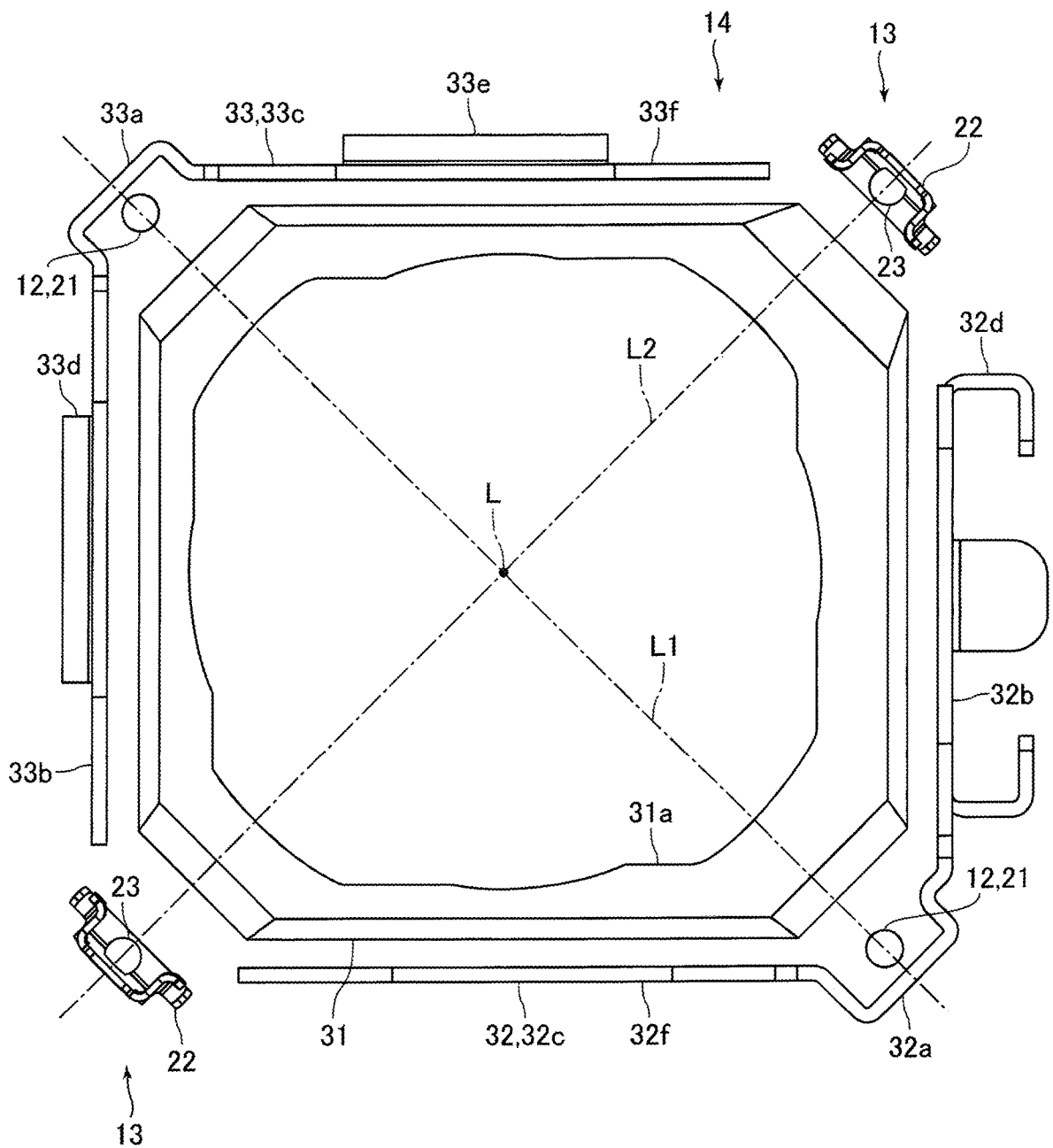
FIG. 3 is a plan view of the holder, a first support, and a second support illustrated in FIG. 2.
Figure 3:
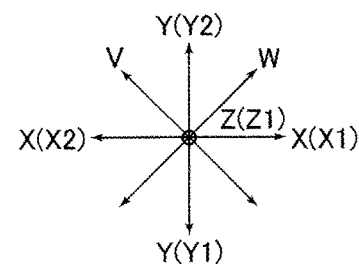

In the following, embodiments of the present invention are described with reference to the drawings.
Overall Configuration of Optical Unit with Shake Correction Function FIG. 1 is a perspective view of an optical unit 1 with a shake correction function according to at least an embodiment of the present invention. FIG. 2 is an exploded perspective view of the optical unit 1 with a shake correction function illustrated in FIG. 1. FIG. 3 is a plan view of a holder 14, first supports 12, and second supports 13 illustrated in FIG. 2.

In the following description, as in FIG. 1, etc., each of three directions orthogonal to one another is referred to as an X-direction, a Y-direction, and a Z-direction, and the X-direction is referred to as a left-right direction, the Y-direction as a front-back direction, and the Z-direction as an up-down direction. An X1-direction side in FIG. 1, etc., which is one direction side in the left-right direction, is referred to as "right side", while an X2-direction side in FIG. 1, etc., which is a direction on a side opposite to the right side, as "left side"; a Y1-direction side in FIG. 1, etc., which is one direction side in the front-back direction, as "front side", while a Y2-direction side in FIG. 1, etc., which is a direction on a side opposite to the front side, as a "back side"; and a Z1-direction side in FIG. 1, etc., which is one direction side in the up-down direction, as "upper side", while a Z2-direction side in FIG. 1, etc., which is a direction on a side opposite to the upper side, as "lower side".

The optical unit 1 with a shake correction function of the present embodiment (hereinafter referred to as "optical unit 1") is a small and thin unit to be mounted in, for example, a mobile device such as a smartphone and includes a camera module 2 including a photographic lens and an image pickup element. The optical unit 1 has a shake correction function to avoid disruption in an image captured when shake occurs during image capturing. The optical unit 1 is formed to have a thin and flat cuboid shape as a whole. The optical unit 1 of the present embodiment is formed to have a regular shape as viewed from the optical axis direction, which is the direction of an optical axis L of the camera module 2. Four side surfaces of the optical unit 1 are parallel to a ZX plane, which consists of the left-right direction and the up-down direction or a YZ plane, which consists of the front-back direction and the up-down direction.

The optical unit 1 includes a movable body 3 (see FIG. 1) including the camera module 2, an intermediate member 4 that holds the movable body 3 in a rotatable manner, and a fixed body 5 (see FIG. 1) that holds the intermediate member 4 in a rotatable manner. The movable body 3 can rotate relative to the intermediate member 4 with a first intersecting direction (direction V in FIG. 3) that intersects the optical axis L of the camera module 2 as an axial direction of rotation. That is, the movable body 3 can rotate relative to the intermediate member 4 around a first axis L1 (see FIG. 3) with the first intersecting direction as an axis direction. The first intersecting direction in the present embodiment is orthogonal to the optical axis L.

The intermediate member 4 can rotate relative to the fixed body 5 with a second intersecting direction (W-direction in FIG. 3), which intersects the first intersecting direction and the optical axis L of the camera module 2, as the axial direction of rotation. That is, the intermediate member 4 can rotate relative to the fixed body 5 with a second axis L2 (see FIG. 3), which has the second intersecting direction as its axis direction, as a center of rotation. In the present embodiment, the second intersecting direction is orthogonal to the first intersecting direction. As described above, a two-axis gimbal mechanism is provided between the movable body 3 and the fixed body 5.

In the present embodiment, when no current is supplied to drive coils 25 and 27 described below, the movable body 3 is disposed at predetermined reference position, and the camera module 2 is also disposed at a predetermined reference position. When the camera module 2 is at the reference position, the optical axis direction of camera module 2 is aligned with the up-down direction. The up-down direction (Z-direction) in the present embodiment is a reference optical axis direction, which is the optical axis direction of the camera module 2 when the camera module 2 is disposed at the reference position. The tilt of the optical axis L of the camera module 2 relative to the up-down direction is slight when shake correction is performed. Therefore, the optical axis direction of the camera module 2 substantially coincides with the up-down direction.

When the movable body 3 is disposed at the reference position, the second intersecting direction (W-direction) is orthogonal to the optical axis L. That is, when the movable body 3 is disposed at the reference position and is not rotating relative to the intermediate member 4, the second intersecting direction is orthogonal to the optical axis L. In contrast, when the movable body 3 rotates relative to the intermediate member 4, the second intersecting direction intersects the optical axis L but not at a right angle. The second intersecting direction (W-direction) is a direction shifted in a clockwise direction in FIG. 3 by approximately 45 degrees relative to the front-back direction as viewed from above.

The optical unit 1 includes drive mechanisms 8 and 9 to rotate the movable body 3 relative to the fixed body 5 so that the optical axis L of the camera module 2 tilts in a selected direction. The optical unit 1 has a first supports 12 that serve as supports for the rotation of the movable body 3 relative to the intermediate member 4 and second supports 13 that serve as supports for the rotation of the intermediate member 4 relative to the fixed body 5. The first supports 12 are disposed at the two ends of the intermediate member 4 in the first intersecting direction, and the second supports 13 are disposed at the two ends of the intermediate member 4 in the second intersecting direction.

The movable body 3 includes a cylindrical holder 14 having an inner peripheral side on which the camera module 2 is fixed. The holder 14 is formed to have a cuboidal shape. The holder 14 is formed in the shape of a square frame, and the outer shape of the holder 14 is square as viewed from the optical axis direction. When the movable body 3 is disposed at the reference position, two of the four sides of the outer peripheral surface of the holder 14, which has a square outer shape, are parallel to the front-back direction, and the remaining two sides are parallel to the left-right direction. The specific configuration of the holder 14 is described below.

The camera module 2 is fixed to an inner peripheral surface of the holder 14 so that the outer peripheral side of lower edge of the camera module 2 is covered by the holder 14. As described above, the camera module 2 includes a lens and an image pickup element. The image pickup element is disposed on the lower edge side of the camera module 2, and an image of a subject disposed on the upper side of the camera module 2 is captured by the camera module 2. The camera module 2 includes a rigid substrate on which the image pickup element is mounted. A flexible printed circuit board 15 ("FPC 15") is led out from the rigid substrate. The FPC 15 is led out toward the right side and then wound around toward the rear side.

As described above, the tilt of the optical axis L of the camera module 2 relative to the up-down direction when shake correction is performed is slight, and the optical axis direction of the camera module 2 substantially coincides with the up-down direction. Therefore, assuming that one side in the optical axis direction of the camera module 2 (specifically, the side on which the subject is positioned in the optical axis direction of the camera module 2) is the subject side and the side opposite to the subject side (specifically, the side on which the image pickup element is positioned in the optical axis direction of the camera module 2) is the counter-subject side, the subject side substantially coincides with the upper side and the counter-subject side substantially coincides the lower side.

The intermediate member 4 is formed of a metallic material such as stainless steel. The intermediate member 4 is a plate spring formed by bending a metal plate having spring properties into a predetermined shape. The intermediate member 4 has a base portion 4a that is disposed above the holder 14, two arms 4b that extend from the base portion 4a toward both sides in the first intersecting direction, and two arms 4c that extend from the base portion 4a toward both sides in the second intersecting direction. The base portion 4a is formed to have a substantially square frame shape. The upper edge of the camera module 2 is disposed on an inner peripheral side of the base portion 4a.

The arms 4b are connected to both edges of the base portion 4a in the first intersecting direction. The arms 4b extend downward from the base portion 4a. The arms 4b are formed as plates with the first intersecting direction as the thickness direction. The distal portions 4d of the arms 4b are positioned at the corners of the holder 14 in the first intersecting direction. Hemispherical recesses 4e in which portions of spherical bodies 21 that constitute the first supports 12 are disposed are formed at the distal portions 4d (see FIG. 2). The recesses 4e are recessed toward the inside in the first intersecting direction.

The arms 4c are connected to both edges of the base portion 4a in the second intersecting direction. The arms 4c extend downward from the base portion 4a. The distal portions 4f of the arms 4c are formed as plates with the second intersecting direction as the thickness direction. The distal portions 4f are disposed on the outer peripheral side of the holder 14. The distal portions 4f are disposed in placement holes 17e described below. Hemispherical recesses in which portions of spherical bodies 23 that constitute the second supports 13 are disposed are formed at the lower ends of the distal portions 4f. The recesses are recessed toward the inside in the second intersecting direction.

The fixed body 5 includes a cylindrical case 17 that is disposed on an outer peripheral side of the movable body 3 and the intermediate member 4, a cover 18 that covers the upper surface of the case 17, and a cover 19 that covers the upper surface of the case 17. The intermediate member 4 is held on the case 17 in a rotatable manner. The case 17 is formed of a resin material. The shape of the case 17 as viewed from the up-down direction has a rectangular frame shape. As viewed from the up-down direction, two sides of the four sides that constitute the outer peripheral surface of the case 17, which has a rectangular outer shape, are parallel to the front-back direction, while the remaining two sides are parallel to the left-right direction.

The case 17 has a case body 17a that is formed as a flat rectangular prism with openings at both ends in the up-down direction, and a board protector 17b that connects to the right side of the case body 17a. The upper and lower end surfaces of the case body 17a are planes orthogonal to the up-down direction. The board protector 17b functions as protection that covers the FPC 15, which is led out from the camera module 2 to the right side, from above. The detailed configuration of the case 17 is described below.

The cover 18 is formed of a metallic material. The cover 18 is formed by bending a thin metal plate into a predetermined shape. The cover 18 has a flat first bottom portion 18a that covers the bottom surface of the case body 17a, a flat second bottom portion 18b that covers the bottom surface of the board protector 17b, and a flat side surface portion 18c that covers the right surface of the board protector 17b. The cover 18 is fixed to the case 17. The first bottom portion 18a is formed to have a square frame shape. The first bottom portion 18a is positioned lower than the second bottom portion 18b. The first bottom portion 18a comes into contact with the lower end surface of the case body 17a.

The cover 19 is formed of a metallic material. The cover 19 is formed by bending a thin metal plate into a predetermined shape. The cover 19 has a flat cover body 19a that is fixed to the top surface of the case body 17a. The cover body 19a is formed to have a square frame shape. The cover body 19a is in contact with the upper end surface of the case body 17a. Portions of the camera module 2 and the intermediate member 4 are disposed on the inner peripheral side of the cover body 19a.

The first supports 12 have spherical bodies 21 that are positioned between the sphere fixing members 32 and 33 (described below) and the arms 4b, which are part of the holder 14. In the present embodiment, the spherical bodies 21 are the first supports 12. The spherical bodies 21 are formed of a metallic material. The spherical bodies 21 are fixed to the sphere fixing members 32 and 33. Portions of the spherical bodies 21 are disposed in the recesses 4e of the arms 4b. The spherical bodies 21 are in contact with the recesses 4e from the outside in the first intersecting direction. The spherical bodies 21 are urged toward the sphere fixing members 32 and 33 by the spring properties of the arms 4b. That is, the arms 4b urge the spherical bodies 21 toward the sphere fixing members 32 and 33. The arms 4b also urge the spherical bodies 21 to the outside of the first intersecting direction.

The second supports 13 include support members 22 that are fixed to the fixed body 5 and spherical bodies 23 that are positioned between the arms 4c and the support members 22. The support members 22 are formed by bending thin metal plates into a predetermined shape. The support members 22 are disposed in the placement holes 17e described below, which are formed in the case 17. The support members 22 are fixed to the placement holes 17e. The spherical bodies 23 are formed of a metallic material. The spherical bodies 23 are fixed to the support members 22.

Portions of the spherical bodies 23 are disposed in the recesses formed in the distal portions 4f of the arms 4c. The spherical bodies 23 are in contact with the recesses from the outside in the second intersecting direction. The support members 22 and the spherical bodies 23 are urged toward the case 17 by the spring properties of the arms 4c. That is, the arms 4c are urging the support members 22 and the spherical bodies 23 toward the case 17. The arms 4c also urge the support members 22 and the spherical bodies 23 to the outside of the second intersecting direction.

The drive mechanism 8 includes a drive magnet 24 and a drive coil 25 that are face each other in the left-right direction. The drive mechanism 9 includes a drive magnet 26 and a drive coil 27 that are each other in the front-back direction. The drive magnets 24 and 26 are formed to have a rectangular flat-plate shape. The drive magnets 24 and 26 are fixed to the holder 14. The drive coils 25 and 27 are, for example, air-core coils formed by winding a conductor around an air-core.

The drive magnet 24 is fixed to the left side of the holder 14. The drive coil 25 is disposed in a through-hole 17c formed in the left surface of the case body 17a. The drive coil 25 is mounted on a flexible printed circuit board 28 (FPC 28). The drive mechanism 8 rotates the movable body 3 relative to the fixed body 5 with an axis orthogonal to the optical axis L of the camera module 2 and parallel to the front-back direction serving as the rotation center.

The drive magnet 26 is fixed to the rear surface of the holder 14. The drive coil 27 is disposed in a through-hole 17d formed in the rear surface of the case body 17a. The drive coil 27 is mounted on the FPC 28. The drive mechanism 9 rotates the movable body 3 relative to the fixed body 5 with an axis orthogonal to the optical axis L of the camera module 2 and parallel to the left-right direction serving as the rotation center. The FPC 28 is led along the rear surface and the left side surface of the case body 17a. The FPC 28 is fixed to the outer peripheral surface of the case body 17a.

In the optical unit 1, when a change in the tilt of the movable body 3 is detected by a predetermined detection mechanism to detect a change in the tilt of the movable body 3, an electric current is supplied to at least one of the drive coil 25 and the drive coil 27 on the basis of a detection result by the detection mechanism, and shake is corrected. The drive mechanisms 8 and 9 rotates the movable body 3 relative to the fixed body 5 with at least one of the first axis L1 and the second axis L2 serving as the rotation center.

In the present embodiment, the first bottom portion 18a of the cover 18 and the cover body 19a of the cover 19, which are fixed to case 17, regulate the range of rotation of the movable body 3 relative to the fixed body 5. Specifically, the holder 14 is positioned between the first bottom portion 18a and the cover body 19a in the up-down direction, and the contact of the holder 14 with the first bottom portion 18a or the cover body 19a regulates the range of rotation of the movable body 3 relative to the fixed body 5. The first bottom portion 18a and the cover body 19a of the present embodiment are fixed to the case 17 and in contact with the holder 14 to serve as rotation regulating members that regulate the range of rotation of the movable body 3 relative to the fixed body 5.

Configuration of Holder

Figure 4:
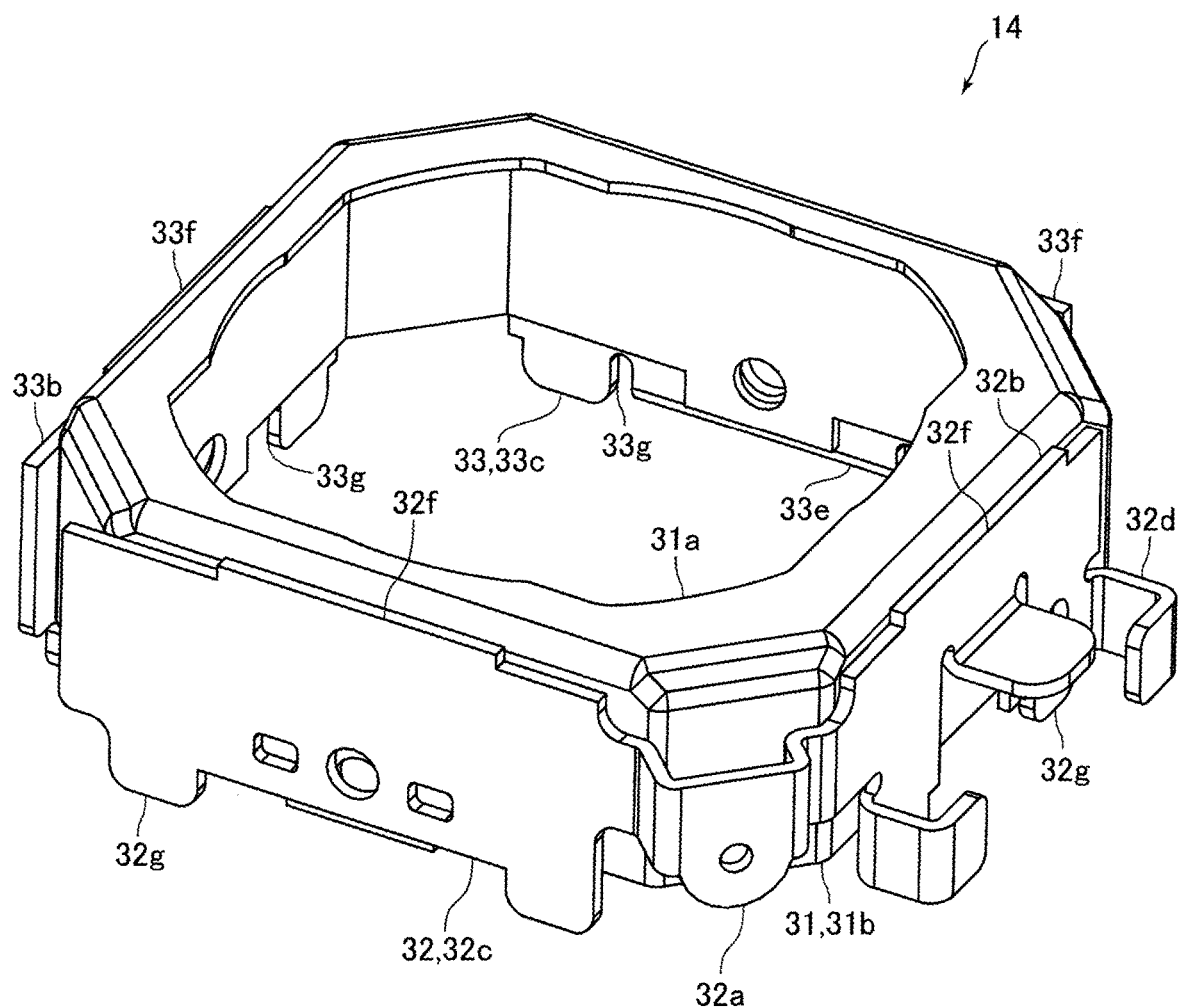
FIG. 4 is a perspective view of the holder illustrated in FIG. 2.
Figure 4:
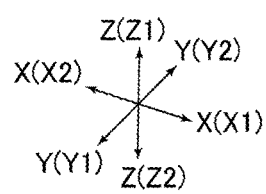

FIG. 4 is a perspective view of the holder 14 illustrated in FIG. 2.

The holder 14 includes a cylindrical module fixing member 31 having an inner peripheral side on which the camera module 2 is fixed, and the sphere fixing members 32 and 33 to which the spherical bodies 21 are fixed. The sphere fixing members 32 and 33 are fixed to the outer peripheral surface of the module fixing member 31. The holder 14 of the present embodiment includes the module fixing member 31 and the two sphere fixing members 32 and 33. The module fixing member 31 and the sphere fixing members 32 and 33 are formed of a metallic material. That is, the holder 14 is formed of a metallic material. The module fixing member 31 and the sphere fixing members 32 and 33 are formed of a magnetic material.

The module fixing member 31 is formed by drawing and punching a metal sheet. An outer shape of the module fixing member 31 as viewed from the optical axis direction is a square. When the movable body 3 is disposed at the reference position, two of the four sides of the outer peripheral surface of the module fixing member 31, which has a square outer shape, are parallel to the front-back direction, and the remaining two sides are parallel to the left-right direction. The module fixing member 31 includes a flat planar upper surface portion 31a, which constitutes the upper surface (subject side surface) of the module fixing member 31, and a square cylindrical portion 31b, which extends from the upper surface portion 31a to the lower side (counter-subject side).

The four corners of the module fixing member 31, which has a square outer shape as viewed from the optical axis direction, are chamfered. The upper surface portion 31a is formed to have a square frame shape. A portion of the camera module 2 is disposed on the inner peripheral side of the upper surface portion 31a. As described above, the module fixing member 31 is formed by drawing and punching a metal sheet, and the boundary between the subject-side surface (upper surface) of the upper surface portion 31a and the outer peripheral surface of the cylindrical portion 31b is a smooth curved surface.

The sphere fixing members 32 and 33 are formed by bending metal plates into a predetermined shape. The sphere fixing member 32 has a sphere fixing portion 32a to which one of the spherical bodies 21 is fixed, a fixed portion 32b to be fixed to the right surface of the cylindrical portion 31b of the module fixing member 31, and a fixed portion 32c to be fixed to the front surface of the cylindrical portion 31b. The sphere fixing member 33 has a sphere fixing portion 33a to which the other one of the spherical bodies 21 is fixed, a fixed portion 33b to be fixed to the left surface of the cylindrical portion 31b, and a fixed portion 33c to be fixed to the rear surface of the cylindrical portion 31b. The sphere fixing members 32 and 33 are fixed to the module fixing member 31, for example, by welding.

The sphere fixing portions 32a and 33a are formed as flat plates with the first intersecting direction as the thickness direction. The sphere fixing portions 32a and 33a are positioned outside of the cylindrical portion 31b in the first intersecting direction. The sphere fixing portion 32a faces the right front corner of the cylindrical portion 31b across a gap. The sphere fixing portion 33a faces the left rear corner of the cylindrical portion 31b across a gap. The sphere fixing portions 32a and 33a have through-holes in which portions of the spherical bodies 21 are placed. The spherical bodies 21 are fixed to the sphere fixing portions 32a and 33a from the inside in the first intersecting direction. For example, the spherical bodies 21 are fixed by being welded to the sphere fixing portions 32a and 33a. The distal portions 4d of the arms 4b of the intermediate member 4 are positioned between the sphere fixing portions 32a and 33a and the cylindrical portion 31b.

The fixed portions 32b, 32c, 33b, and 33c are formed as flat plates. When the movable body 3 is disposed at the reference position, the direction of thickness of the fixed portions 32b and 33b coincides with the left-right direction, and the direction of thickness of the fixed portions 32c and 33c coincides with the front-back direction. The fixed portions 32b, 32c, 33b, and 33c are, for example, fixed by welding to the module fixing member 31. On the right side of the fixed portion 32b, a substrate holding portion 32d is formed to hold a portion of the FPC 15 in a folded state. The drive magnet 24 is fixed to the left surface of the fixed portion 33b. The drive magnet 26 is fixed to the rear surface of the fixed portion 33c. The lower edge of the fixed portion 33b is connected to a magnet placement portion 33d on which the drive magnet 24 is placed. The lower edge of the fixed portion 33c is connected to a magnet placement portion 33e on which the drive magnet 26 is placed.

The upper end surfaces (subject-side end surfaces) of the sphere fixing members 32 and 33 are positioned below (on the counter-subject side of) the upper surface of the module fixing member 31 (i.e., the subject-side surface of the upper surface portion 31a). The lower end surface (counter-subject side end surface) of the sphere fixing member 32, excluding a portion of the fixed portion 32b, and the lower end surface (counter-subject side end surface) of the sphere fixing member 33 are positioned below (on the counter-subject side of) the lower end surface of the module fixing member 31 (i.e., the counter-subject end surface of the cylindrical portion 31b). The sphere fixing members 32 and 33 constitute portions of the outer peripheral surface of the holder 14. The upper edge of the cylindrical portion 31b of the module fixing member 31 constitutes a portion of the outer peripheral surface of the holder 14.

The outer peripheral surface of the holder 14 has an edge 32f constituting the edge of the subject-side end surface of the sphere fixing member 32, an edge 33f constituting the edge of the subject-side end surface of the sphere fixing member 33, an edge 32g constituting the edge of the counter-subject-side end surface of the sphere fixing member 32, and an edge 33g constituting the edge of the counter-subject-side end surface of the sphere fixing member 33 That is, the outer peripheral surface of the holder 14 has the edges 32f and 32g that constitute the end surfaces of the sphere fixing member 32 in the optical axis direction of the camera module 2 and the edges 33f and 33g that constitute the end surfaces of the sphere fixing member 33 in the optical axis direction of the camera module 2.

The sphere fixing members 32 and 33 of the present embodiment are metal parts that constitute portions of the outer peripheral surface of the holder 14. As described above, the boundary between the subject-side surface (upper surface) of the upper surface portion 31a of the module fixing member 31 and the outer peripheral surface of the cylindrical portion 31b is a smooth curved surface, so no edge is formed at the upper end of the cylindrical portion 31b.

Configuration of Case

Figure 5:
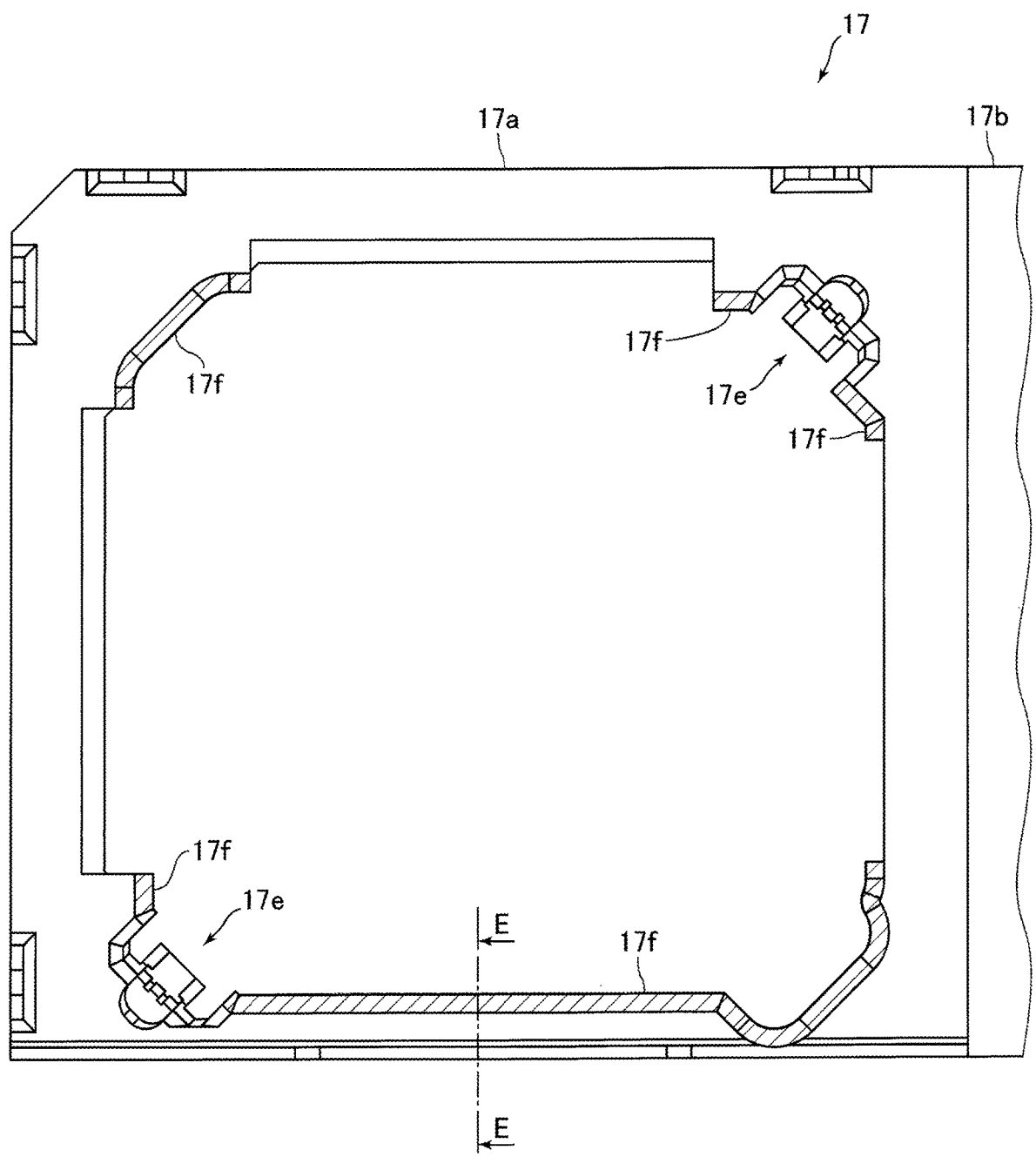
FIG. 5 is a plan view of the case body illustrated in FIG. 2.
Figure 6:
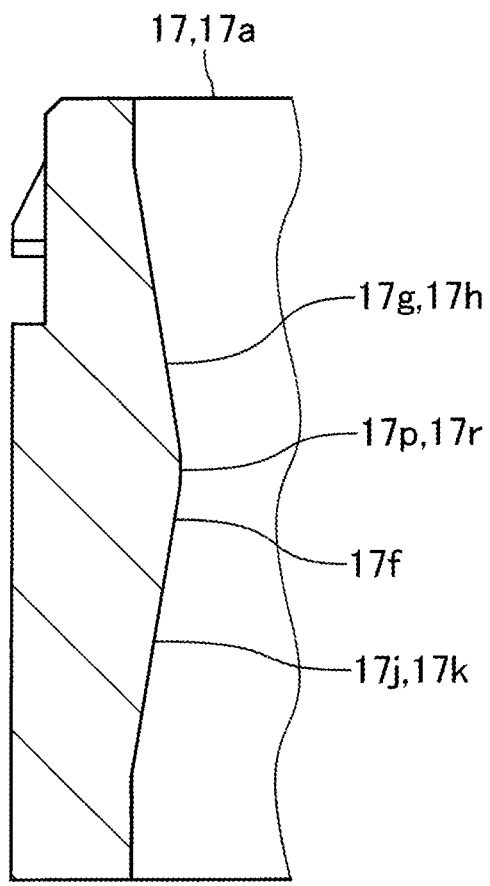
FIG. 6 is a cross-sectional view of an E-E section of FIG. 5.
Figure 7:
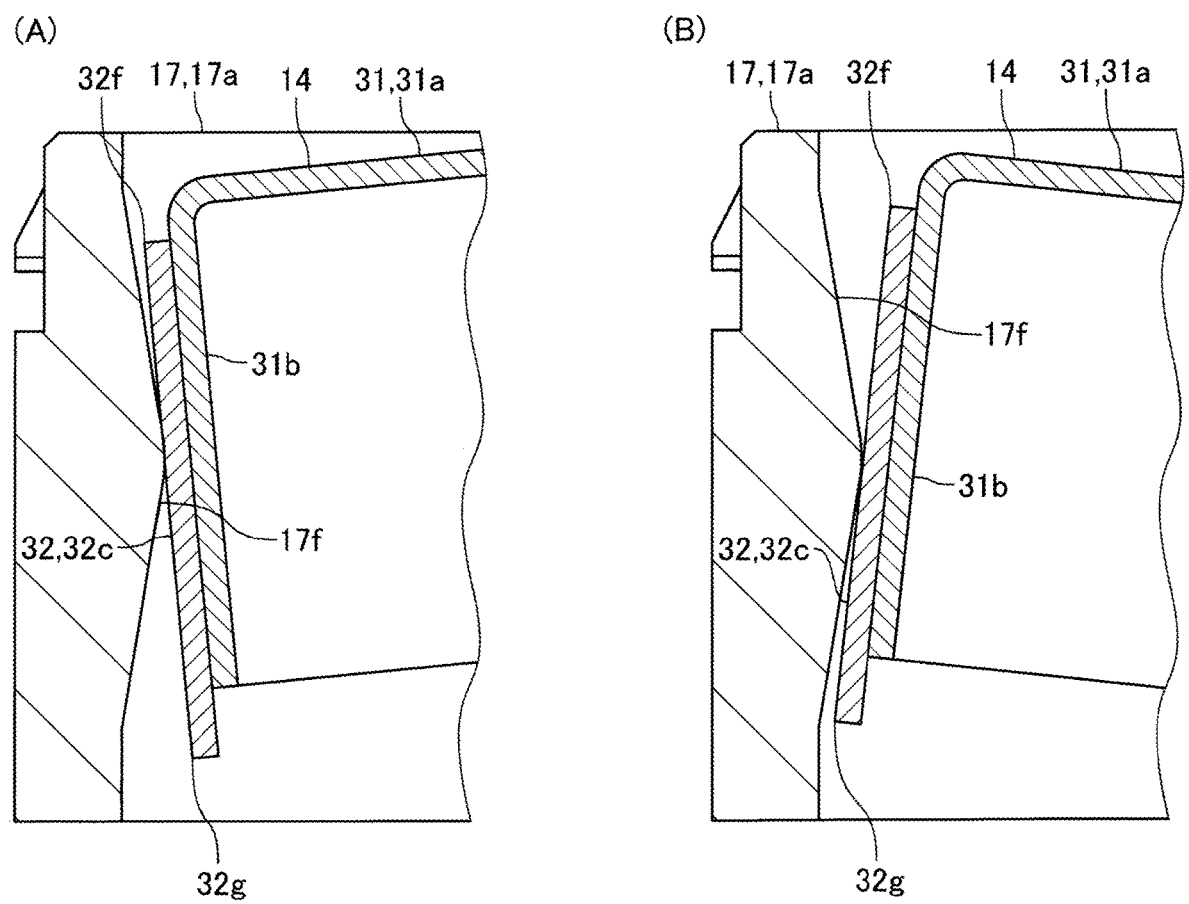

FIG. 5 is a plan view of the case body 17a illustrated in FIG. 2. FIG. 6 is a cross-sectional view of an E-E section of FIG. 5. (A) and (B) of FIG. 7 are schematic diagrams for describing the relationship between the holder 14 and the case 17 when the optical unit 1 illustrated in FIG. 1 is subjected to shock such as a drop.

As described above, the case 17 has a case body 17a that is formed as a flat rectangular prism with openings at both ends in the up-down direction, and a board protector 17b that connects to the right side of the case body 17a. The case body 17a surrounds the outer peripheral surface of the holder 14. That is, the case 17 surrounds the outer peripheral surface of holder 14. The case body 17a has the placement holes 17e in which the support members 22 are placed and fixed. The placement holes 17e are formed at both ends of the case 17 in the second intersecting direction. That is, the placement holes 17e are formed at two locations: the left front end corner and the right rear end corner of the case 17.

Protrusions 17f as case-side protrusions projecting toward the inner peripheral side of the case body 17a are formed on the inner peripheral side of the case body 17a. That is, the protrusions 17f projecting toward the inner peripheral side of the case 17 are formed on the inner peripheral side of the case 17. As described above, the through-hole 17c is formed in the left surface of the case body 17a, and a through-hole 17d is formed in the rear surface of the case body 17a. A through-hole (not illustrated) is formed in the right surface of the case body 17a to lead out the FPC 15. The protrusions 17f are formed on the inner peripheral side of the case body 17a on a portion excluding the through-holes 17c and 17d, the through-hole formed on the right side of the case body 17a, and the placement holes 17e. The protrusions 17f are indicated by the hatched parts in FIG. 5.

As illustrated in FIG. 6, each of the protrusions 17f has of a first tilting portion 17h, a second tilting portion 17k, and a connecting portion 17r. The first tilting portion 17h constitutes the upper portion of the protrusion 17f and has a first tilting surface 17g that tilts farther to the outer peripheral side of the case body 17a at the upper portion. The second tilting portion 17k constitutes the lower portion of the protrusion 17f and has a second tilting surface 17j that tilts farther to the outer peripheral side of the case body 17a at the lower portion. The connecting portion 17r connects the lower end of the first tilting surface 17g and the upper end of the second tilting surface 17j and has a connecting surface 17p that is parallel to the up-down direction. The first tilting surface 17g, the second tilting surface 17j, and the connecting surface 17p constitute a portion of the inner peripheral surface of the case body 17a.

As illustrated in FIG. 6, the protrusion 17f has an isopod trapezoidal longitudinal cross-sectional shape. The center of the protrusion 17f in the up-down direction is at the same position as the fulcrum of the rotation of the intermediate member 4 in the up-down direction relative to the fixed body 5. That is, the center of the protrusion 17f in the up-down direction is at the same position as the corresponding spherical body 23 in the up-down direction. More specifically, the center of the protrusion 17f in the up-down direction is at the same position as the center of the corresponding spherical body 23 in the up-down direction.

As described above, the first bottom portion 18a of the cover 18 and the cover body 19a of the cover 19, which are fixed to case 17, regulate the range of rotation of the movable body 3 relative to the fixed body 5. In the present embodiment, when the movable body 3 moves relative to the fixed body 5 in the front-back and left-right directions (the radial direction of the camera module 2), which is orthogonal to the up-down direction, while the optical axis L of the camera module 2 tilts the most, the portion of the outer peripheral surface of the holder 14 other than the edges 32f, 32g, 33f, and 33g comes into contact the protrusion 17f (see (A) and (B) of FIG. 7) before the edges 32f, 32g, 33f, and 33g formed on the outer peripheral surface of the holder 14 comes into contact with the inner peripheral surface of the case 17 (i.e., the inner peripheral surface of the case body 17a).

Specifically, when the movable body 3 moves in the front-back and left-right directions relative to the fixed body 5 while the optical axis L of the camera module 2 tilts the most, the inner portions of the sphere fixing members 32 and 33 farther in the up-down direction than the edges 32f, 32g, 33f, and 33g (i.e., the portion between edges 32f and 32g on the outer surface of sphere fixing member 32 and the portion between edges 33f and 33g on the outer surface of sphere fixing member 33) come into contact with the protrusion 17f before the edges 32f, 32g, 33f, and 33g come into contact with the inner surface of the case 17.

That is, when the movable body 3 moves in the front-back and left-right directions relative to the fixed body 5 while the optical axis L of the camera module 2 tilts the most, the height and formation position of the protrusion 17f are set so that the inner portion of the sphere fixing members 32 and 33 farther inward than the edges 32f, 32g, 33f, and 33g in the up-down direction comes into contact with the protrusion 17f before the edges 32f, 32g, 33f, and 33g come into contact with the inner peripheral surface of the case 17. The front-back and left-right directions in the present embodiment are a first direction orthogonal to the optical axis L of the camera module 2 at the reference position.

Main Advantageous Effects of the Present Embodiment

As described above, in the present embodiment, the cylindrical holder 14 having an inner peripheral side on which the camera module 2 is fixed is composed of metal. Therefore, in the present embodiment, the thickness of the holder 14 in the radial direction of the camera module 2 can be reduced while the strength of the holder 14 is maintained. Therefore, in the present embodiment, the holder 14 can be made smaller in the radial direction of the camera module 2 while the strength of the holder 14 is maintained.

In the present embodiment, the sphere fixing members 32 and 33 constituting a portion of the outer peripheral surface of the holder 14 is composed of metal, and the outer peripheral surface of the holder 14 has the edges 32f and 32g that constitute the end surfaces of the sphere fixing member 32 in the optical axis direction of the camera module 2 and the edges 33f and 33g that constitute the end surfaces of the sphere fixing member 33 in the optical axis direction of the camera module 2. Therefore, in the present embodiment, if a drop or other impact is applied to the optical unit 1, and the outer edges 32f, 32g, 33f, and 33g of the holder 14 collide with the inner peripheral surface of the resin case 17, the resin case 17 may be scraped and dust may b e generated.

However, in the present embodiment, the protrusions 17f projecting toward the inner peripheral side of the case 17 is formed on the inner peripheral side of the case 17. When the movable body 3 moves in the front-back and left-right directions relative to the fixed body 5 while the optical axis L of the camera module 2 tilts the most, the inner portion of the sphere fixing members 32 and 33 farther inward than the edges 32f, 32g, 33f, and 33g in the up-down direction comes into contact with the protrusion 17f before the edges 32f, 32g, 33f, and 33g come into contact with the inner peripheral surface of the case 17. Therefore, in the present embodiment, even if the holder 14 moves excessively in the front-back and left-right directions due to a drop or other impact applied to the optical unit 1, the edges 32f, 32g, 33f, and 33g can be prevented from colliding with the inner peripheral surface of the resin case 17. Therefore, in the present embodiment, even if the optical unit 1 is subjected to impact, it is possible to prevent the resin case 17 from being scraped and dust from being generated.

In the present embodiment, the range of rotation of the movable body 3 relative to the fixed body 5 is regulated by the first bottom portion 18a of the cover 18, which is fixed to the case 17 and in contact with the holder 14, and by the cover body 19a of the cover 19. However, since the covers 18 and 19 are composed of metal, dust can be prevented from being generated even if the first bottom portion 18a comes into contact with the holder 14, or if the cover body 19a comes into contact with the holder 14.

In the present embodiment, the center of the protrusion 17f of the case 17 in the up-down direction is at the same position as the fulcrum of the rotation of the intermediate member 4 in the up-down direction relative to the fixed body 5. Therefore, in the present embodiment, even if the amount of projection of the protrusions 17f is reduced, it is possible to prevent the edges 32f, 32g, 33f, and 33g from coming into contact with the inner peripheral surface of the case 17 when the movable body 3 moves in the front-back and left-right directions relative to the fixed body 5 while the optical axis L of the camera module 2 tilts the most. Therefore, in the present embodiment, it is possible to reduce the size of the case 17 in the radial direction of the camera module 2 while preventing the edges 32f, 32g, 33f, and 33g from coming into contact with the inner peripheral surface of the case 17 when the movable body 3 moves in the front-back and left-right directions relative to the fixed body 5 while the optical axis L of the camera module 2 tilts the most.

In the present embodiment, the protrusions 17f each have the first tilting portion 17h, the second tilting portion 17k, and the connecting portion 17r, and the protrusions 17f are formed over a relatively wide area in the up-down direction. Therefore, the strength of the case 17 can be increased in the present embodiment.

Other Embodiments

Although the above-described embodiment is one of the exemplary embodiments of the present invention, the present invention is not limited thereto and can be modified in various ways in a range without altering the gist of the present invention.

In the embodiments described above, the upper end surfaces of the sphere fixing members 32 and 33 may be positioned above the upper surface of the module fixing member 31, and the sphere fixing members 32 and 33 may constitute the entire outer peripheral surface of the holder 14. In the embodiments described above, the centers of the protrusions 17f of the case 17 in the up-down direction may be shifted from the fulcrums of the rotation of the intermediate member 4 in the up-down direction relative to the fixed body 5. In the embodiments described above, each protrusion 17f may have the first tilting portion 17h and the second tilting portion 17k. In such a case, the protrusion 17f has an isosceles triangle shape in longitudinal cross-section. In the embodiments described above, the longitudinal cross-section of the protrusion 17f may be convex-curved.

In the embodiments described above, an edge may be formed at the upper end of the cylindrical portion 31b of the module fixing member 31. In such a case, when the movable body 3 moves in the front-back and left-right directions relative to the fixed body 5 while the optical axis L of the camera module 2 tilts the most, the inner portion of the sphere fixing members 32 and 33 farther inward than the edges 32f, 32g, 33f, and 33g in the up-down direction comes into contact with the protrusion 17f before the edge formed at the upper end of the cylindrical portion 31b and the edges 32f, 32g, 33f, and 33g come into contact with the inner peripheral surface of the case 17.

Figure 8:
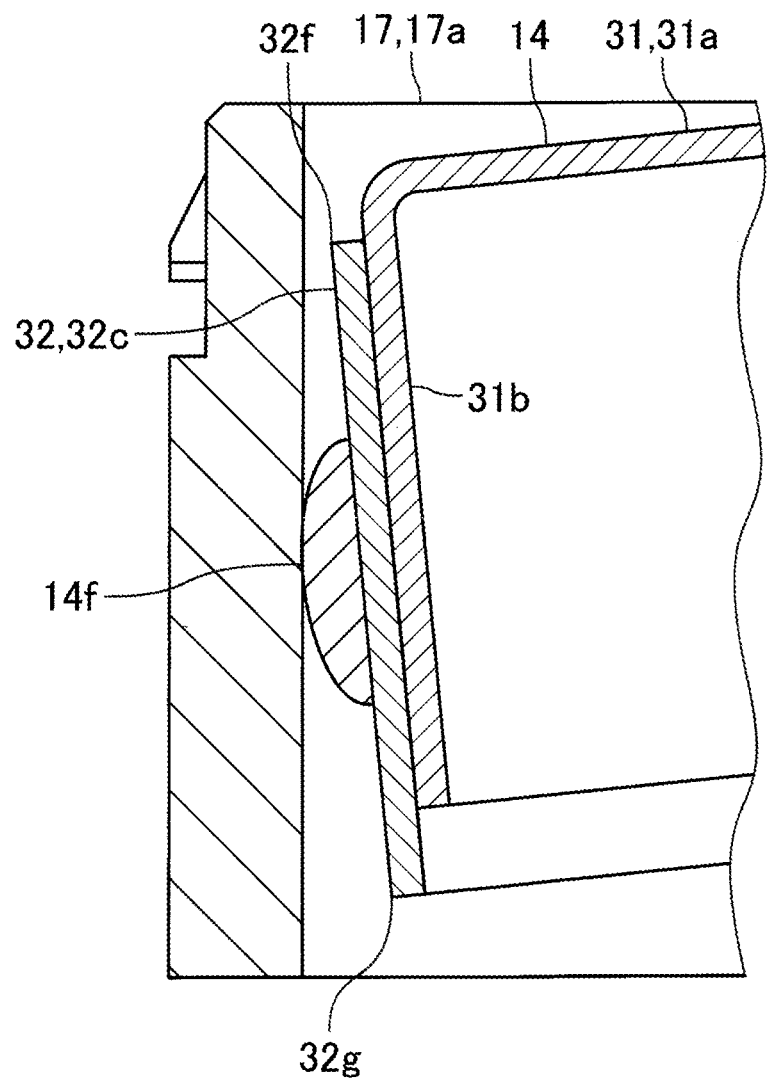
FIG. 8 is a schematic diagram for describing the configuration of the holder and the case according to at least another embodiment of the present invention.

In the embodiments described above, the protrusions 17f may not be formed on the inner peripheral side of the case 17. In such a case, protrusions 14f serving as holder-side protrusions projecting toward the outer peripheral side of the holder 14 is formed or fixed on the outer peripheral side of the holder 14 (see FIG. 8). In such a case, when the movable body 3 moves in the front-back and left-right directions relative to the fixed body 5 while the optical axis L of the camera module 2 tilts the most, the protrusions 14f come into contact with the inner peripheral surface of the case 17 before edges 32f, 32g, 33f, and 33g formed on the outer peripheral surface of the holder 14 come into contact with the inner peripheral surface of the case 17.

For such a case, also, as in the present embodiment, even if the optical unit 1 is subjected to impact, it is possible to prevent the resin case 17 from being scraped and dust from being generated. The protrusions 14f may be composed of metal or resin. If the protrusions 14f are composed of metal, no edges are formed on the protrusions 14f As in the embodiments described above, when the protrusions 17*f* are formed on the resin case 17, it is easier to form the protrusions 17*f* than when the protrusions 14*f* are formed or fixed on the metal holder 14.

In the embodiment described above, the optical unit 1 may include a rotation mechanism to rotate the camera module 2 with respect to the intermediate member 4 with the optical axis L of the camera module 2 as the rotation center. In such a case, the intermediate member 4 includes a first intermediate member and a second intermediate member. The movable body 3 is rotatable relative to the first intermediate member with the optical axis L of the camera module 2 as the rotation center, and the first intermediate member is rotatable relative to the second intermediate member with the first axis L1 as the rotation center.

In the embodiments described above, the first intersecting direction (V-direction) need not be orthogonal to the optical axis L, and the second intersecting direction (W-direction) need not be orthogonal to the first crossing direction. In the embodiments described above, the optical unit 1 may be mounted in various devices other than the mobile devices.

Configuration of Present Technique

Note that the present technique may have configurations as described below.

(1) An optical unit with a shake correction function, includes: a movable body comprising a camera module; an intermediate member that holds the movable body in a rotatable manner; a fixed body that holds the intermediate member in a rotatable manner; and a drive mechanism to rotate the movable body relative to the fixed body in such a manner that an optical axis of the camera module tilts in a selected direction, wherein, the movable body comprises a cylindrical metal holder having an inner peripheral side on which the camera module is fixed, the movable body being rotatable relative to the intermediate member with a first intersecting direction being an axial direction of rotation, the first intersecting direction intersecting the optical axis of the camera module, the intermediate member comprises a plate spring and is rotatable relative to the fixed body with a second intersecting direction being an axial direction of rotation, the second intersecting direction intersecting the first intersecting direction and the optical axis of the camera module, the fixed body comprising a cylindrical resin case surrounding an outer peripheral surface of the holder, and a metal rotation regulating member being fixed to the case and being in contact with the holder to regulate a range of rotation of the movable body relative to the fixed body, and when a direction of the optical axis of the camera module is an optical axis direction, and a direction orthogonal to the optical axis of the camera module positioned at a predetermined reference position is a first direction, the outer peripheral surface of the holder has an edge comprising an end portion of an end surface in the optical axis direction of a metal part comprising at least a portion of the outer peripheral surface of the holder, an inner peripheral side of the case has a case-side protrusion projecting toward the inner peripheral side of the case, and when the movable body moves in the first direction relative to the fixed body while the optical axis of the camera module has a maximum tilt, a portion of the metal part disposed farther inward than the edge in the optical axis direction comes into contact with the case-side protrusion before the edge comes into contact with an inner peripheral surface of the case, or a holder-side protrusion projecting toward an outer peripheral side of the holder is formed or fixed on the outer peripheral side of the holder, and when the movable body moves in the first direction relative to the fixed body while the optical axis of the camera module has the maximum tilt, the holder-side protrusion comes into contact with the inner peripheral surface of the case before the edge comes into contact with the inner peripheral surface of the case.

(2) The optical unit with a shake correction function according to description (1), further includes: a spherical body serving as a fulcrum of rotation of the movable body relative to the intermediate member, wherein, the holder comprises a cylindrical module fixing member having an inner peripheral side on which the camera module is fixed, and a sphere fixing member to which the spherical body is fixed, the sphere fixing member being fixed to an outer peripheral surface of the module fixing member, and the sphere fixing member comprises the metal part.

(3) The optical unit with a shake correction function according to description (1) or (2), wherein the case-side protrusion is formed on the inner peripheral side of the case.

(4) The optical unit with a shake correction function according to description (3), wherein when the optical axis direction is a reference optical axis direction while the camera module is positioned at the reference position, a center of the case-side protrusion in the reference optical axis direction is positioned at a same position in the reference optical axis as a fulcrum of the rotation of the intermediate member relative to the fixed body.

(5) The optical unit with a shake correction function according to description (3) or (4), wherein when the optical axis direction is a reference optical axis direction while the camera module is positioned at the reference position, the case-side protrusion comprises a first tilting portion, a second tilting portion, and a connecting portion, the first tilting portion having a first tilting surface tilting farther to an outer peripheral side of the case at one side in the reference optical axis direction, the second tilting portion having a second tilting surface tilting farther to the outer peripheral side of the case at another side in the reference optical axis direction, the connecting portion having a connecting surface connecting the first tilting surface and the second tilting surface and being disposed parallel to the reference optical axis direction.

What is claimed is:

1. An optical unit with a shake correction function, comprising:
a movable body comprising a camera module;
an intermediate member that holds the movable body in a rotatable manner;
a fixed body that holds the intermediate member in a rotatable manner; and
a drive mechanism to rotate the movable body relative to the fixed body in such a manner that an optical axis of the camera module tilts in a selected direction, wherein,
the movable body comprises a cylindrical metal holder having an inner peripheral side on which the camera module is fixed, the movable body being rotatable relative to the intermediate member with a first intersecting direction being an axial direction of rotation, the first intersecting direction intersecting the optical axis of the camera module, the intermediate member comprises a plate spring and is rotatable relative to the fixed body with a second intersecting direction being an axial direction of rotation, the second intersecting direction intersecting the first intersecting direction and the optical axis of the camera module, the fixed body comprising a cylindrical resin case surrounding an outer peripheral surface of the holder, and a metal rotation regulating member being fixed to the case and being in contact with the holder to regulate a range of rotation of the movable body relative to the fixed body, and when a direction of the optical axis of the camera module is an optical axis direction, and a direction orthogonal to the optical axis of the camera module positioned at a predetermined reference position is a first direction, the outer peripheral surface of the holder has an edge comprising an end portion of an end surface in the optical axis direction of a metal part comprising at least a portion of the outer peripheral surface of the holder, an inner peripheral side of the case has a case-side protrusion projecting toward the inner peripheral side of the case, and when the movable body moves in the first direction relative to the fixed body while the optical axis of the camera module has a maximum tilt, a portion of the metal part disposed farther inward than the edge in the optical axis direction comes into contact with the case-side protrusion before the edge comes into contact with an inner peripheral surface of the case, or a holder-side protrusion projecting toward an outer peripheral side of the holder is formed or fixed on the outer peripheral side of the holder, and when the movable body moves in the first direction relative to the fixed body while the optical axis of the camera module has the maximum tilt, the holder-side protrusion comes into contact with the inner peripheral surface of the case before the edge comes into contact with the inner peripheral surface of the case.

2. The optical unit with a shake correction function according to claim 1, further comprising:

a spherical body serving as a fulcrum of rotation of the movable body relative to the intermediate member, wherein, the holder comprises a cylindrical module fixing member having an inner peripheral side on which the camera module is fixed, and a sphere fixing member to which the spherical body is fixed, the sphere fixing member being fixed to an outer peripheral surface of the module fixing member, and the sphere fixing member comprises the metal part.

3. The optical unit with a shake correction function according to claim 1, wherein the case-side protrusion is formed on the inner peripheral side of the case.

4. The optical unit with a shake correction function according to claim 3, wherein when the optical axis direction is a reference optical axis direction while the camera module is positioned at the reference position, a center of the case-side protrusion in the reference optical axis direction is positioned at a same position in the reference optical axis direction as a fulcrum of the rotation of the intermediate member relative to the fixed body.

5. The optical unit with a shake correction function according to claim 3, wherein when the optical axis direction is a reference optical axis direction while the camera module is positioned at the reference position, the case-side protrusion comprises a first tilting portion, a second tilting portion, and a connecting portion, the first tilting portion having a first tilting surface tilting farther to an outer peripheral side of the case at one side in the reference optical axis direction, the second tilting portion having a second tilting surface tilting farther to the outer peripheral side of the case at another side in the reference optical axis direction, the connecting portion having a connecting surface connecting the first tilting surface and the second tilting surface and being disposed parallel to the reference optical axis direction.

* * * * *